United States Patent [19]

Nagatomo et al.

[11] Patent Number: 5,023,104
[45] Date of Patent: Jun. 11, 1991

[54] DEFATTED SOYBEANS AND SOYBEAN PROTEIN OBTAINED FROM THE SAME

[75] Inventors: Shinichiro Nagatomo, Sennan; Masahiko Terashima, Osaka; Hitoshi Taniguchi, Sennan, all of Japan

[73] Assignee: Fuji Oil Company, Limited, Osaka, Japan

[21] Appl. No.: 383,531

[22] Filed: Jul. 21, 1989

Related U.S. Application Data

[63] Continuation-in-part of Ser. No. 157,723, Feb. 22, 1988, abandoned.

[30] Foreign Application Priority Data

Feb. 24, 1987 [JP] Japan .................................. 62-41624
Mar. 6, 1987 [JP] Japan .................................. 62-52815

[51] Int. Cl.⁵ .................................................. A23L 1/212
[52] U.S. Cl. .......................................................... 426/634
[58] Field of Search ............................................ 426/634

[56] References Cited

U.S. PATENT DOCUMENTS

| | | | |
|---|---|---|---|
| 4,322,344 | 3/1982 | Chen et al. | 426/634 |
| 4,410,554 | 10/1983 | Sailer | 426/634 |
| 4,614,665 | 9/1986 | Furuya et al. | 426/634 |
| 4,677,247 | 6/1987 | Kitamura | 800/1 |

*Primary Examiner*—Donald E. Czaja
*Assistant Examiner*—Helen Pratt
*Attorney, Agent, or Firm*—Wenderoth, Lind & Ponack

[57] ABSTRACT

Defatted soybeans having NSI of between 70 and 92 and TBA value of not more than 40 is disclosed. Soybean protein having good taste can be obtained from the defatted soybeans in a high yield.

1 Claim, 1 Drawing Sheet

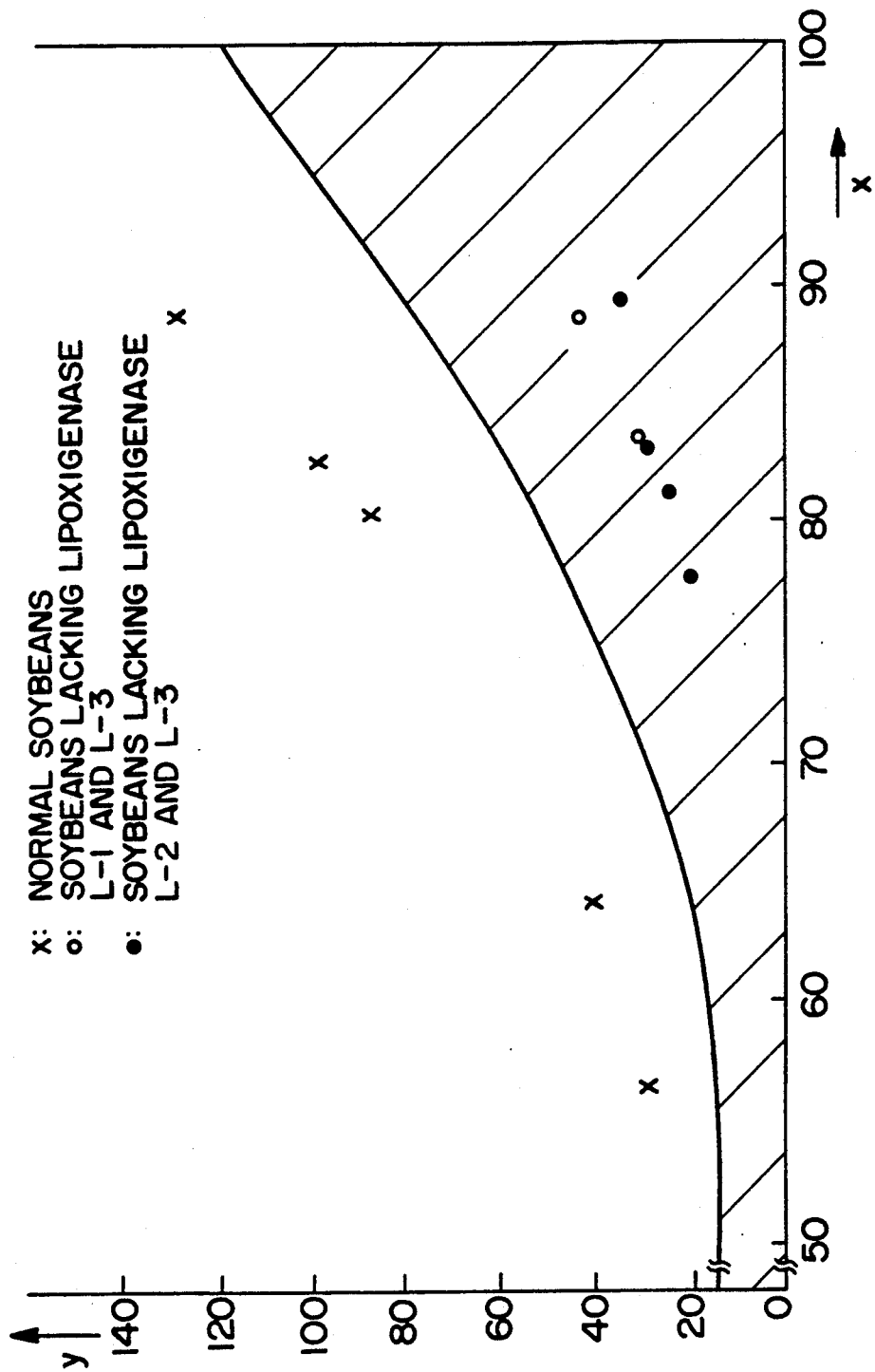

DEFATTED SOYBEANS AND SOYBEAN PROTEIN OBTAINED FROM THE SAME

This application is a continuation-in-part application of application Ser. No. 157,723 filed Feb. 22, 1988. now abandoned.

FIELD OF THE INVENTION

The present invention relates to defatted soybeans having good water solubility (nitrogen solubility index (NSI)) as well as good taste. The present invention also relates to soybean protein obtained from the defatted soybeans.

BACKGROUND OF THE INVENTION

Soybean proteins having various protein contents are produced from defatted soybeans. For example, powdered defatted soymilk having a relatively low protein content is obtained by removing insoluble materials, i.e., so-called "okara" from defatted soybeans. Concentrated soybean protein the protein content of which is higher than powdered defatted soymilk is obtained by removing whey component from defatted soybeans. Isolated soybean protein which has a most highest protein content is obtained by removing both "okara" and whey component from defatted soybeans. These soybean proteins are used for various purposes.

Thus, defatted soybeans are very important raw materials in the production of various soybean proteins.

In order to obtain soybean protein having good taste, defatted soybeans having good taste are required. For this purpose, various developments and studies have been done and it has been found that lipoxigenase participates in formation of so-called grassy-flavor which adversely affects taste of defatted soybeans. Then, there have been developed many processes for producing soybean protein by inactivating or inhibiting lipoxigenase.

In practice, inactivation of lipoxigenase is generally effected by heating. In this case, as lipoxigenase is inactivated, soybean protein is also denaturated with heating and, thereby, NSI of the resulting defatted soybeans are lowered. Therefore, when the protein is extracted with an aqueous solvent such as in the case of the production of isolated soybean protein or soybean curd (so-called "tofu"), there is a problem that yield is lowered. That is, although soybean protein having good taste can be obtained by inactivation of lipoxigenase with heating, yield of soybean protein is lowered. Further, such a heating requires very complicated temperature control.

If it is necessary to make great account of yield, defatted soybeans having high NSI should be used. However, in defatted soybeans having high NSI, heat denaturation of protein is little and, naturally, lipoxigenase is not inactivated, which results in bad taste of defatted soybeans, or soybean protein and "tofu" obtained therefrom.

As means for increasing in yield of soybean protein, various extraction processes such as alkali extraction of defatted soybeans and extraction using a reducing agent have been known. However, there is a problem of bad taste due to formation of alkaline odor and the like.

Thus, hitherto, it has been considered that, when NSI of defatted soybeans is lower, taste thereof is better. In other words, defatted soybeans having both high NSI and good taste have been hardly obtained and it has been difficult to obtain soybean protein having good taste in a high yield.

Further, in the case of concentrated soybean protein wherein an aqueous acidic solvent is used, there is another problem that, when NSI is low, emulsifiability and gelation properties become inferior. Furthermore, when NSI is low, there is still another problem that, in the case of the production of textured soybean protein, soybean protein is hardly texturized.

On the other hand, recently, it has become feasible to produce a new variety of soybeans which lacks some of its lipoxigenase isozymes, simultaneously, and it has been proposed to use the variety in the production of soybean products having less grassy-flavor.

For example, the Japanese newspaper, Nikkei Sangyo Shinbun dated Nov. 8, 1986, discloses an article relating to commercialization (processing and production of soymilk yoghurt, "tofu", fermented soybeans (so-called "natto"), etc.) of a new variety, "pleasant soybeans", free from grassy-flavor and bitterness. In Japanese Patent Kokai No. 61-170359, there is disclosed raw materials for food (soymilk) and food products (processed soymilk products) made from soybeans lacking lipoxigenase isozymes L-2 and L-3. Further, the Kokai No. 61-170359 also discloses bean sprouts of the soybeans lacking lipoxigenase isozymes L-2 and L-3 in which grassy-flavor is reduced. K. Kitamura, Nippon Nogei Kagaku Kaishi, "Removal of unpleasant flavor of soybeans by genetic breeding", 59, (10) 1071–1078 (1985) discloses that several series of soybeans lacking lipoxigenase isozymes L-2 and L-3 are obtained and almost grassy-flavor can be removed. Further, K. Kitamura, Nippon Shokuhin Kogyo Gakkaishi 31, (11), 751–758, (1984) discloses breeding of lipoxigenase lowering soybeans. Japanese Patent Kokai No. 61-56027 and U.S. patent application Ser. No. 769,235 filed Aug. 26, 1985 also disclose a process for producing new variety of odorless soybeans which lack lipoxigenase isozymes.

OBJECTS OF THE INVENTION

The present inventors have found that, by using the above soybeans which lack lipoxigenase due to genetic breeding, it is possible to eliminate a heating step for inactivating lipoxigenase in a conventional process for producing defatted soybeans and thereby defatted soybeans having both high NSI and good taste together with soybean oil having good taste can be obtained. Particularly, it has been found that defatted soybeans having a specific high NSI as well as a specific low TBA (thiobarbituric acid) value, which is an index of activity of lipoxigenase, obtainable from the above soybeans lacking lipoxigenase are suitable for the production of soybean protein having good taste in a high yield and that, by using the defatted soybeans, it is possible to obtain soybean protein in which bean flavor, pungency, astringency, etc. are improved in a high yield.

One object of the present invention is to provide defatted soybeans having both high NSI and good taste.

Another object of the present invention is to provide soybean protein having good taste which can be produced in a high yield.

These objects as well as other objects and advantages of the present invention will become apparent to those skilled in the art from the following description with reference to the accompanying drawing.

BRIEF EXPLANATION OF DRAWING

FIG. 1 is a graph showing a relation between NSI (x axis) and TBA value (y axis) of defatted soybeans.

SUMMARY OF THE INVENTION

According to the present invention, there is provided defatted soybeans having NSI of between 70 and 92 and TBA value of not more than 40. The defatted soybeans of the present invention can be obtained, for example, by removing fats and oils from soybeans lacking two of three lipoxigenase isozyme L-1, L-2 and L-3 at the same time. The present invention also provides soybean protein having HSI of between 70 to 99 and TBA value of not more than 13 which is obtained from the above defatted soybeans having NSI of between 70 and 92 and TBA value of not more than 40.

In the present invention, a heating step for inactivation of lipoxigenase in a conventional process for producing defatted soybeans can be minimized or eliminated and temperature control in defatted soybean production can be facilitated. Further, the resulting defatted soybeans have both high NSI and good taste and soybean oil obtained simultaneously has also good taste even in a crude oil state. Furthermore, soybean protein having good taste can be obtained from the defatted soybeans of the present invention in a high yield.

DETAILED DESCRIPTION OF THE INVENTION

In FIG. 1, NSI of defatted soybeans is plotted on the x axis. NSI used herein is defined as follows.

Defatted soybeans (3.5 g) are weighed precisely and deionized water (100 ml) is added. The mixture is stirred at 40° C. for 1 hour to extract protein and centrifuged at 1000 g. The supernatant is transferred into a measuring flask. Again, deionized water is added to the residue and the same extraction procedure is repeated. The supernatant obtained is combined with the above supernatant and the mixture is adjusted to a predetermined volume. The mixture is filtered through filter paper (Toyo Filter Paper K.K. No. 6) and the nitrogen in the filtrate is measured by Kjeldahl method to determine water soluble nitrogen. Total nitrogen is determined by measuring nitrogen of the defatted soybean sample. NSI is calculated by dividing the water soluble nitrogen by the total nitrogen and multiplying the quotient with 100.

The NSI (x) of the defatted soybeans of the present invention is $70 \leq x \leq 92$.

Since the soybeans of the present invention have a high NSI and good taste, extraction efficiency of soybean protein having good taste becomes higher. That is, usually, taste of defatted soybeans obtained by a conventional method is not good, unless NSI is not more than 65 (i.e., $x \leq 65$). However, according to the present invention, taste of defatted soybeans is very good, even if NSI is higher than 65. When NSI of defatted soybeans becomes higher, a more higher yield of high functional soybean protein (e.g., concentrated soybean protein, isolated soybean protein, defatted soymilk, etc.) can be attained.

In FIG. 1, TBA value of defatted soybeans is plotted on y axis. TBA value used herein is defined as follows.

A mixture of a sample (10 g) and deionized water (50 ml) is homogenized by a homogenizer to obtain a uniform suspension. The suspension is transferred into a flask with deionized water (45 ml). To the mixture is added 4N hydrochloric acid (5 ml) and the mixture is subjected to steam distillation immediately to obtain distillate (50 ml). To the distillate (4 ml) are added aqueous 0.1% ferrous chloride solution (1 ml) and TBA solution (0.02M solution of 2-thiobarbituric acid in 90% acetic acid solution) (5 ml), and the mixture is heated at 75° C. for 35 minutes. The mixture is cooled in running water for 10 minutes and absorbance at a wavelength of 450 nm is determined by a spectrophotometer. On the other hand, according to the same procedure, a standard curve of n-hexanal is prepared and, based on the standard curve, the n-hexanal content in the sample is calculated to obtain TBA value [i.e., concentration (ppm) of n-hexanal].

TBA value (y) of defatted soybeans of the present invention is $y \leq 40$.

When a TBA value becomes higher, taste of defatted soybeans becomes worse. Defatted soybeans obtain by a conventional method have usually TBA value of about 130 (y=130), when NSI is about 90 (x=90). Then, by effecting a heat treatment to lower NSI to about 60 (x=60), TBA value can be brought to as low as about 40 (y=40). However, according to the present invention, even if NSI of defatted soybeans is about 90, TBA value is about 40 and the defatted soybeans have good taste.

Although the oil content of the defatted soybeans of the present invention varies depending upon a particular degree of removal of fats and oils, a particular size of flakes and the like, usually, it is about not more than 3% by weight and, mostly, about not more than 1% by weight. However, depending upon use of the defatted soybeans, its oil content may be higher (e.g., 3 to 8% by weight).

The crude protein content of the defatted soybeans of the present invention varies depending upon a particular variety of soybeans, a particular degree of removal of fats and oils, and the like. However, usually, it is within the range of 40 to 65% by weight, preferably 45 to 60% by weight.

The crude fiber content of the defatted soybeans of the present invention is usually 1 to 5% by weight, preferably, 1.5 to 4.5% by weight.

The defatted soybeans of the present invention can be produced, for example, as follows.

That is, the defatted soybeans of the present invention can be produced by removing fats and oils from soybeans lacking at least two lipoxigenase isozymes at the same time.

As described above, lipoxigenase isozymes include L-1, L-2 and L-3 and, in the present invention, soybeans lacking at least two of these lipoxigenase isozymes at the same time are used. These soybeans are known and obtained by genetic breeding. For example, soybeans lacking L-2 and L-3 (hereinafter referred to as L-2,3 lacking soybeans) can be obtained according to the method described by K. Kitamura [the above Nippon Nogei Kagaku Kaishi 59, (10) 1071-1078 (1985); Nippon Shokuhin Kogyo Gakkaishi 31, (11), 751-758 (1984)]. Soybeans lacking L-1 and L-3 (hereinafter referred to as L-1,3 lacking soybeans) can be also obtained by K. Kitamura [Japan, J. Breed. Vol. 35, No. 4 (1985)].

These soybeans can be subjected to removal of fats and oils directly. However, preferably, cracking, dehulling and flaking are effected before removal of fats and oils.

Cracking can be effected on the soybeans directly. However, preferably, in order to facilitate dehulling, firstly, soybeans are pre dried up to about 8 to 12% by weight of the moisture content. Drying can be carried out by using known means such as a hot-air drier or the like. Cracking can be carried out according to a conventional method such as by using a cracking roll or the like to divide each bean into two pieces.

Dehulling can be carried out according to a conventional method.

Flaking can be carried out according to a conventional method such as by using a roll. Preferably, flaking is carried out so that flakes having about 0.5 mm in thickness are obtained to facilitate removal of fats and oils. Of course, this thickness can be varied according to a particular use.

Removal of fats and oils can be carried out according to a conventional method. For example, the flaked soybeans can be extracted with an organic solvent (e.g., n-hexane, alcohols, methyl ethyl ketone, acetone, other azeotropes, etc.), or removal of fats and oils can be carried out by using supercritical gas such as carbon dioxide in supercritical conditions.

Since the soybeans lacking at least two lipoxigenase isozymes contain less lipoxigenase, a heat treatment for inactivating lipoxigenase such as that in a conventional method is not required or minimized (e.g., the temperature of the heat treatment can be lowered) in the present invention as described above. Therefore, in the present invention, a heat treatment at a high temperature such as that in a conventional method, which results in lowering of NSI, can be avoided and any severe temperature control is not required in the present invention.

Further, the resulting soybean oil has good taste even in a crude oil state and a refined soybean oil obtained therefrom by deacidification and deodorization has less reversion.

Soybean protein of the present invention includes soymilk, concentrated soybean protein, isolated soybean protein and other soybean protein products such as "tofu" and the like, and has NSI of between 70 to 99 and TBA value of not more than 13. The soybean protein is produced from the above defatted soybeans of the present invention according to a conventional manner, for example, with an aqueous medium or aqueous alcohol (e.g., aqueous ethanol, etc.). And, depending upon the desired use of the soybean protein, they can be further subjected other treatments such as, for example, removal of whey or "okara" and drying.

For example, in the case of the production of concentrated soybean protein, the defatted soybeans can be extracted with water at pH about the isoelectric point of soybean protein and then whey component can be removed to obtain the desired product. Or, the defatted soybeans can be also extracted with an aqueous alcohol (e.g., 60 v/v % aqueous alcohol) and then whey component can be removed to obtain the desired concentrated soybean protein.

In the case of powdered soymilk, the defatted soybeans can be extracted with water at pH other than about the isoelectric point of soybean protein and then "okara" is removed to obtain the desired product.

In the case of isolated soybean protein, the defatted soybeans can be extracted by water with adjusting pH to remove both whey and "okara" to obtain the desired product.

According to the present invention, soybean protein having good taste can be obtained in a high yield. In the following Table 1, there is shown the yield and taste of isolated soybean protein obtained from normal defatted soybeans, L-2,3 lacking defatted soybeans or L-1,3 lacking defatted soybeans. In Table 1, the yield represents the weight ratio (%) of the yield of the isolated soybean protein to the raw defatted soybeans. Taste represents total organoleptical evaluation of bean flavor, astringency and the like and the smaller value represents better taste (see Example 5 and Comparative Example 4 hereinafter).

TABLE 1

| Defatted Soybeans | Yield | Taste |
| --- | --- | --- |
| Normal defatted soybeans | 22.5–34.7 | 4.5–2.0 |
| L-2,3 lacking defatted soybeans | 35.9–33.3 | 2.0–1.5 |
| L-1,3 lacking defatted soybeans | 39.1–36.6 | 3.0–1.5 |

The soybean protein of the present invention thus obtained can be consumed as it is as food, or it can be used as a raw material for producing another food product according to a conventional technique.

The following Examples and Comparative Examples further illustrate the present invention in detail but are not to be construed to limit the scope thereof.

EXAMPLE 1

L-2,3 lacking soybeans and L-1,3 lacking soybeans were dried with hot air at 75° C., cracked with a cracking roll, dehulled with an air sorter and then flaking with a roll to obtain flakes having 0.5 mm in thickness, respectively. The flakes were extracted with n-hexane and then desolventizing was effected with heating to obtain defatted soybeans. NSI, TBA value and crude protein (CP: Kjeldahl nitrogen × 6.25) of the resulting defatted soybeans are shown in Table 2. In Table 2, the defatted soybeans Nos. 1 and 5 are corresponding to the defatted soybeans obtained in the above. The defatted soybeans Nos. 2 and 6 are those obtained by effecting fluidized heating at 140° C. for 11 seconds instead of the above drying with hot air. The defatted soybeans Nos. 3 and 4 are those obtained by effecting fluidized heating at 140° C. for 15 and 17 seconds, respectively.

TABLE 2

| | L-2,3 lacking defatted soybeans | | | | L-1,3 lacking defatted soybeans | |
| --- | --- | --- | --- | --- | --- | --- |
| | No. | | | | | |
| | 1 | 2 | 3 | 4 | 5 | 6 |
| TBA value | 35 | 29 | 24.5 | 20 | 44 | 30.5 |
| NSI | 89.0 | 83.5 | 81 | 78 | 88.5 | 84.0 |
| CP | 50.7 | 50.9 | 51.0 | 50.9 | 54.2 | 53.9 |

-: Not determined.

Respective defatted soybeans thus obtained had about 0.5% by weight of oil content (OC) and 2 to 3.5% by weight of crude fiber content (CF).

NSI, TBA value and CP were determined as described above. OC was determined by using Soxhlet's extractor with ethyl ether. CF was determined by Henneberg-Stohmann method. NSI and TBA values of the defatted soybeans Nos. 1 to 6 are plotted in FIG. 1 by the symbols of o and o.

COMPARATIVE EXAMPLE 1

According to the same manner as described in Example 1, defatted soybeans were obtained from soybeans harvested in United States. NSI and TBA value of the resulting defatted soybeans are shown in Table 3. In Table 3, the defatted soybeans No. 1 is corresponding to that obtained in the above. The defatted soybeans Nos. 2' to 5' are corresponding to those obtained by effecting fluidized heating at 140° C. for 11 seconds instead of drying with hot air; by effecting fluidized heating at 140° C. for 15 seconds instead of drying with hot air; by effecting fluidized heating at 140° C. for 11 seconds instead of drying with hot air and effecting desolventizing at 95° C. for 12 minutes; and by effecting fluidized heating at 140° C. for 20 seconds instead of drying with hot air and effecting desolventizing at 95° C. for 12 hours, respectively.

TABLE 3

| | No. | | | | |
|---|---|---|---|---|---|
| | 1' | 2' | 3' | 4' | 5' |
| TBA | 129 | 101 | 88 | 42 | 30 |
| NSI | 89 | 83.5 | 80.4 | 64.0 | 56.5 |
| CP | 49.9 | 50.2 | 50.5 | 50.0 | 50.2 |

-: Not determined.

OC and CF of these defatted soybeans were about 0.5% by weight, and about 3.2% by weight, respectively.

These relations between NSI and TBA values are plotted in FIG. 1 by the symbol of x.

Each of the defatted soybeans (1 part by weight) of Example 1 and Comparative Example 1 was admixed with water (4 parts by weight) to obtain a dispersion. 20 Panelists evaluated taste of each suspension and decided ranking according to taste. The results are as follows: Defatted soybeans No. 4 > Defatted soybeans No. 3 = Defatted soybeans No. 5' > Defatted soybeans No. 2 = Defatted soybeans No. 6 > Defatted soybeans No. 1 > Defatted soybeans No. 4' = Defatted soybeans No. 5 > Defatted soybeans No. 3' > Defatted soybeans No. 2' > Defatted soybeans No. 1'.

EXAMPLE 2

Hot water (40 kg) at 40° C. was added to each of defatted soybeans Nos. 1, 2, 5 and 6 (4 kg) obtained in Example 1 and pH of the mixture was adjusted to pH 7.0 with NaOH. After stirring for 1 hour and extraction, "okara" was removed by centrifugation to obtain defatted soymilk. This was concentrated to the solids content of 16% by weight by using "Centritherm" (a centrifugal film vacuum concentrator manufactured by ALFA-LAVAL Co., SWEDEN), heated with a sterilizer at 110° C. for 5 minutes, and sprayed to obtain powdered soymilk.

CP, NSI, yield and taste of the powdered soymilk thus obtained are shown in Table 4.

TABLE 4

| Defatted soybeans No. | CP | NSI | Yield (%) | Bean odor | Astringency |
|---|---|---|---|---|---|
| 1 | 65.2 | 94.3 | 63.6 | 0.5 | 2 |
| 2 | 65.7 | 96.6 | 63.0 | 0.5 | 1.5 |
| 5 | 67.8 | 94.8 | 66.8 | 2.5 | 2 |
| 6 | 67.1 | 94.5 | 64.7 | 1.5 | 1.5 |

In Table 4, yield is the ratio (%) of the powdered soymilk to the defatted soybeans used.

Bean odor and astringency are relative values obtained in organoleptic evaluation of taste (20 panelists) by taking those of the soymilk obtained from the above defatted soybeans No. 1' as 10 (see Comparative Example 2 hereinafter). This relative value represents a concentration (%) of the soymilk obtained from the defatted soybeans No. 1' in a solution having the same taste as that of 10% solution of each soymilk obtained in Example 2.

As seen from Table 4, taste of the powdered soymilk of the present invention is bland which is corresponding to about ¼ of that of the soymilk obtained from normal soybeans.

COMPARATIVE EXAMPLE 2

According to the same manner as described in Example 2, powdered soymilks were produced from the above defatted soybeans Nos. 1', 2' and 4', respectively. CP, NSI, yield and taste of the soymilk thus obtained are shown in Table 5.

TABLE 5

| Defatted soybeans No. | CP | NSI | Yield (%) | Bean odor | Astringency |
|---|---|---|---|---|---|
| 1' | 64.7 | 95.4 | 62.7 | 10 | 10 |
| 2' | 64.9 | 96.7 | 61.5 | 8 | 8 |
| 4' | 63.3 | 96.7 | 52.5 | 4 | 2 |

Each of defatted soybeans Nos. 1, 2, 5 and 6 (Example 4) and 1', 2' and 4' (Comparative Example 3) was ground and warm water (40 kg) at 40° C. was added to the ground soybeans (4 kg). The mixture was adjusted to pH 4.5 with hydrochloric acid and stirred for 30 minutes. The mixture was centrifuged to recover curd. Tap water (25 kg) was added to the curd. The mixture was stirred and, again, centrifuged to recover curd. NaOH was added to curd to adjust to pH 7.0 and the mixture was homogenized at 150 kg/cm² with a high pressure homogenizer (manufactured by Mantongolin Co., USA). The homogenized mixture was sterilized and spray dried to obtain concentrated soybean protein. CP, NSI, yield and taste of the resulting concentrated soybean protein are as shown in Table 6.

TABLE 6

| Defatted soybeans No. | CP | NSI | Yield (%) | Bean odor | Astringency |
|---|---|---|---|---|---|
| 1 | 71.1 | 83.6 | 62.0 | 1 | 3 |
| 2 | 71.1 | 81.8 | 62.2 | 1 | 2.5 |
| 5 | 73.8 | 83.9 | 62.5 | 2 | 3 |
| 6 | 73.5 | 83.7 | 62.1 | 1 | 2.5 |
| 1' | 69.3 | 84.4 | 62.4 | 10 | 10 |
| 2' | 70.2 | 84.0 | 61.9 | 8 | 8 |
| 4' | 69.0 | 67.2 | 62.5 | 3 | 3 |

As seen from Table 6, the concentrated soybean protein of the present invention (Example 4) has good taste and a high yield in comparison with that obtained from conventional concentrated soybean protein (Comparative Example 3).

EXAMPLE 5 AND COMPARATIVE EXAMPLE 4

To each (4 kg) of defatted soybeans Nos. 1, 2, 5 and 6 (Example 5) and 1' 2' and 4' (Comparative Example 4) was added warm water (40 kg) at 40° C. and the mixture was adjusted to pH 7 with NaOH. The mixture was stirred for 1 hour to extract soybean protein and centrifuged to remove "okara". The soymilk thus obtained was adjusted to pH 4.5 with hydrochloric acid and then centrifuged to recover curd. Tap water (25 kg) was added to the curd and the mixture was stirred. Again, the mixture was centrifuged to recover curd. NaOH was added to the curd to adjust to pH 7.0 and water added to obtain neutralized soybean protein solution having about 10% by weight of solids content. The soybean protein was sterilized and spray-dried to obtain isolated soybean protein.

CP, NSI, TBA, yield and taste of the resulting isolated soybean protein are shown in Table 7.

TABLE 7

| Defatted soybeans No. | CP | NSI | TBA | Yield (%) | Bean odor | Astringency |
| --- | --- | --- | --- | --- | --- | --- |
| 1 | 91.1 | 96.6 | 12 | 35.9 | 0.5 | 1.5 |
| 2 | 91.4 | 96.8 | 10 | 33.3 | 0.5 | 1.0 |
| 5 | 91.4 | 97.7 | 13 | 39.1 | 1.5 | 1.5 |

TABLE 7-continued

| Defatted soybeans No. | CP | NSI | TBA | Yield (%) | Bean odor | Astringency |
| --- | --- | --- | --- | --- | --- | --- |
| 6 | 91.5 | 96.8 | 11 | 36.6 | 0.5 | 1.0 |
| 1' | 90.9 | 98.0 | 72 | 34.7 | 10 | 10 |
| 2' | 91.5 | 96.6 | 50 | 32.6 | 8 | 7 |
| 4' | 92.2 | 97.4 | 10 | 22.5 | 3 | 1.5 |

As seen from Table 7, the isolated soybean protein of the present invention (Example 5) has good taste and a high yield in comparison with conventional isolated soybean protein (Comparative Example 4).

What is claimed is:

1. Defatted soybeans having an NSI of between 70 and 92 and TBA value of not more than 40 obtained from cracked dehulled and flaked soybeans lacking at least two lipoxigenase isozymes.

* * * * *